Mar. 3, 1925.

K. W. GASCHE

STORAGE BATTERY

Filed July 17, 1922

1,528,293

INVENTOR:
Karl W Gasche,
BY
ATTORNEY

Patented Mar. 3, 1925.

1,528,293

UNITED STATES PATENT OFFICE.

KARL W. GASCHE, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE BATTERY.

Application filed July 17, 1922. Serial No. 575,512.

*To all whom it may concern:*

Be it known that I, KARL W. GASCHE, a citizen of the United States, residing at Pittsburgh, in the county of Allegheny and State of Pennsylvania, have invented certain new and useful Improvements in Storage Batteries, of which the following is a specification.

My invention relates to electric batteries, and particularly to batteries of the secondary or storage type.

I will describe two forms of storage batteries embodying my invention, and will then point out the novel features thereof in claims.

Figure 1:
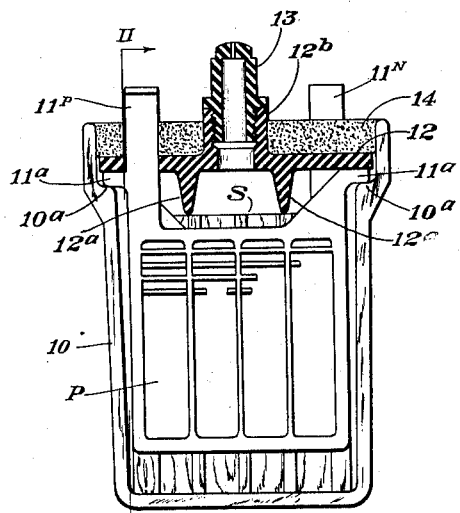
Figure 2:
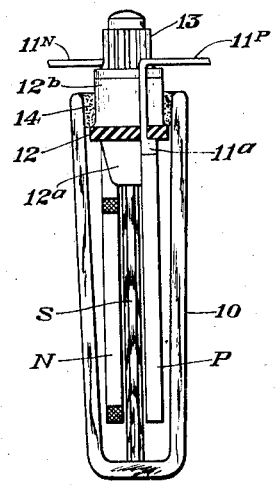
Figure 3:
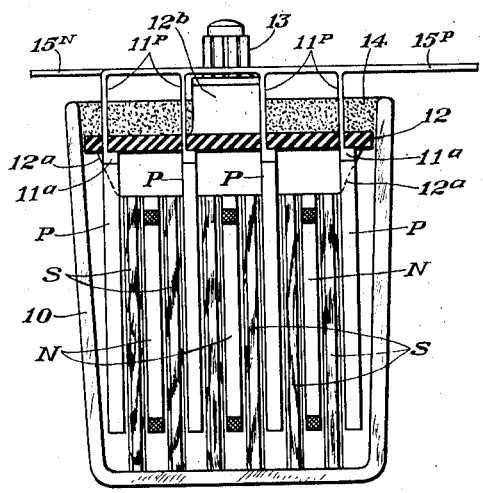

In the accompanying drawing, Fig. 1 is a vertical sectional view showing one form of battery embodying my invention, and Fig. 2 is a vertical sectional view taken on the line II—II of Fig. 1 looking in the direction indicated by the arrows. Fig. 3 is a sectional view showing a modification of the battery shown in Figs. 1 and 2.

Similar reference characters refer to similar parts in each of the several views.

Referring first to Figs. 1 and 2, the reference character 10 designates a battery jar, which is usually formed of glass, hard rubber, or other similar insulating material. This jar is provided with two inside ledges $10^a$, $10^a$, on opposite sides, which ledges are located near the rim or top of the jar. The jar contains a positive plate P, a negative plate N, and a separator S. As clearly shown in Fig. 1, the positive plate P is provided with two ears $11^a$, $11^a$, arranged to rest on the two ledges $10^a$, $10^a$, respectively, whereby the plate is suspended from these ledges. The negative plate N is provided with two similar ears co-operating with the two ledges in the same manner so that this plate likewise is suspended from the ledges.

The jar is provided with a cell cover 12, which, in the form here shown, rests on the plate ears $11^a$. The positive plate P is provided with a terminal lug $11^P$, which projects upwardly through a suitable hole in the cover 12, and the negative plate is provided with a similar terminal lug $11^N$, which likewise projects upwardly through a hole in the cover 12. The reference character 14 designates sealing compound which fills the portion of the jar above the cover 12, and so serves to seal the battery and make it acid tight.

The cover 12 is provided with an upstanding vent plug socket $12^b$, the inside of which is threaded to receive a vent plug 13. Projecting downwardly from the under surface of the cover 12 are two lugs $12^a$, $12^a$, which co-operate with the separator S to hold this separator down in place between the plates P and N. It is, of course, understood that the cell is filled with a suitable liquid electrolyte, and so it will be seen that in the absence of the ribs $12^a$ the separator would float and so would rise to the under surface of the cover 12.

Referring now to Fig. 3, the battery illustrated in this view is the same as that shown in Figs. 1 and 2, except that it comprises four positive plates P, and three negative plates N, instead of one plate of each polarity as in the preceding views. Each positive plate is provided as before with a terminal lug $11^P$ projecting upwardly through the cell cover 12 and sealing compound 14, and all four of these lugs are electrically connected by a terminal strap $15^P$, which strap may be attached to the lugs in any suitable manner, such for example as by lead burning. The negative plates N are provided with similar lugs which are likewise electrically connected by a terminal strap $15^N$.

Although I have herein shown and described only two forms of storage batteries embodying my invention, it is understood that various changes and modifications may be made therein within the scope of the appended claims without departing from the spirit and scope of my invention.

Having thus described my invention, what I claim is:

1. A storage battery comprising a jar provided with a ledge near the top, plates provided with ears resting on said ledge, and a cell cover resting on said ears.

2. A storage battery comprising a jar having inside ledges on two opposite sides, a plurality of plates in said jar each having two ears resting on said two ledges respectively whereby the plates are suspended from said ledges, a cell cover resting on said plate ears, a terminal lug on each plate projecting through said cell cover, and a terminal strap connecting all of said lugs above said cover.

3. A storage battery comprising a jar having inside ledges on opposite sides, a pair of plates each having two ears resting on said two ledges respectively, a cell cover supported by said plate ears, a terminal lug on each plate projecting through said cover, a separator between said plates, and a rib on the under side of said cover to hold said separator down.

In testimony whereof I affix my signature.

KARL W. GASCHE.